(12) United States Patent
Kittur

(10) Patent No.: US 11,796,113 B2
(45) Date of Patent: Oct. 24, 2023

(54) DAMPING EXTRUSIONS

(71) Applicant: Abey Australia Pty. Ltd., Victoria (AU)

(72) Inventor: Venkatesh Kittur, Victoria (AU)

(73) Assignee: Abey Australia Pty. Ltd., Victoria (AU)

( * ) Notice: Subject to any disclaimer, the term of this patent is extended or adjusted under 35 U.S.C. 154(b) by 0 days.

(21) Appl. No.: 15/734,908

(22) PCT Filed: Jun. 6, 2019

(86) PCT No.: PCT/AU2019/050579
§ 371 (c)(1),
(2) Date: Dec. 3, 2020

(87) PCT Pub. No.: WO2019/232581
PCT Pub. Date: Dec. 12, 2019

(65) Prior Publication Data
US 2021/0231252 A1    Jul. 29, 2021

(30) Foreign Application Priority Data

Jun. 6, 2018   (AU) ................................ 2018902020

(51) Int. Cl.
*F16L 55/035* (2006.01)
*F16F 1/36* (2006.01)
(Continued)

(52) U.S. Cl.
CPC .......... *F16L 55/035* (2013.01); *F16F 1/3605* (2013.01); *F16F 15/08* (2013.01);
(Continued)

(58) Field of Classification Search
CPC ... F16L 55/035; F16L 55/0335; F16L 55/033; F16L 3/12; F16L 3/14; F16L 3/1222;
(Continued)

(56) References Cited

U.S. PATENT DOCUMENTS 2,387,295 A * 10/1945 Robertson ............. F16L 3/1233
174/40 CC
3,334,928 A *  8/1967 Schmunk ................ F16L 17/04
285/236

(Continued)

FOREIGN PATENT DOCUMENTS

CH         565341 A5    8/1975
EP        0742404 A1   11/1996
(Continued)

OTHER PUBLICATIONS

International Preliminary Report on Patentability issued for PCT/AU2019/050579 dated Jun. 6, 2019, 10 pages.

*Primary Examiner* — Nkeisha Smith
(74) *Attorney, Agent, or Firm* — Polsinelli PC

(57) ABSTRACT

A damping extrusion, preferably made from a thermoplastic vulcanizate (TPV), for use with a clip for piping/tubing/ducting comprises an elongate body having a side wall at, or towards each side, an upper surface that, in use, faces the clip, and a lower surface that, in use, faces the piping/tubing/ducting. The damping extrusion comprises a first protrusion extending from the lower surface at, or towards each side of the elongate body and a second protrusion extending from the lower surface at, or about a centre of the elongate body. An inner wall of at least one of the first protrusions is concave and at least one or both of the side walls of the elongate body has a concave recess.

21 Claims, 7 Drawing Sheets

(51) Int. Cl.
*F16F 15/08* (2006.01)
*F16L 3/12* (2006.01)
*F16L 55/033* (2006.01)

(52) U.S. Cl.
CPC ............. *F16L 3/12* (2013.01); *F16L 55/0335* (2013.01); *F16F 2224/025* (2013.01); *F16F 2226/04* (2013.01); *F16F 2230/02* (2013.01)

(58) Field of Classification Search
CPC ....... F16L 3/1211; F16L 3/1233; F16L 3/123; F16L 3/1236; F16F 1/3605; F16F 15/08; F16F 2224/025; F16F 2226/04; F16F 2230/02; B29C 48/12; B29C 48/16
See application file for complete search history.

(56) References Cited

U.S. PATENT DOCUMENTS

| | | | | |
|---|---|---|---|---|
| 3,856,245 | A * | 12/1974 | Byerly | F16L 3/12 |
| | | | | 248/74.3 |
| 3,995,795 | A * | 12/1976 | Hogan | F16L 3/1233 |
| | | | | 248/68.1 |
| 4,189,807 | A * | 2/1980 | Byerly | F16L 55/035 |
| | | | | 174/40 CC |
| 4,441,677 | A * | 4/1984 | Byerly | F16L 55/035 |
| | | | | 24/DIG. 22 |
| 5,215,281 | A * | 6/1993 | Sherman | F16L 55/035 |
| | | | | 248/62 |
| 5,384,936 | A * | 1/1995 | Van Walraven | F16L 3/133 |
| | | | | 24/279 |
| 5,647,564 | A * | 7/1997 | Van Walraven | F16L 55/035 |
| | | | | 248/74.2 |
| 9,982,824 | B2 * | 5/2018 | Koenig | F16L 3/1075 |
| 10,317,002 | B2 * | 6/2019 | Nijdam | F16L 3/12 |
| 10,837,586 | B2 * | 11/2020 | Juzak | F16L 55/033 |
| 11,193,620 | B2 * | 12/2021 | Nijdam | F16L 3/1016 |
| 2009/0026766 | A1 * | 1/2009 | Van Walraven | F16L 3/1016 |
| | | | | 285/420 |
| 2018/0031149 | A1 * | 2/2018 | Van Der Mik | F16L 55/035 |
| 2020/0041040 | A1 * | 2/2020 | Geppert | F16L 3/08 |
| 2020/0400261 | A1 * | 12/2020 | Park | F16L 3/1016 |
| 2022/0316647 | A1 * | 10/2022 | Krämer | F16L 3/1233 |

FOREIGN PATENT DOCUMENTS

| | | |
|---|---|---|
| EP | 1770323 A2 | 4/2007 |
| FR | 2220738 A1 | 10/1974 |
| WO | 2018149646 A1 | 8/2018 |

* cited by examiner

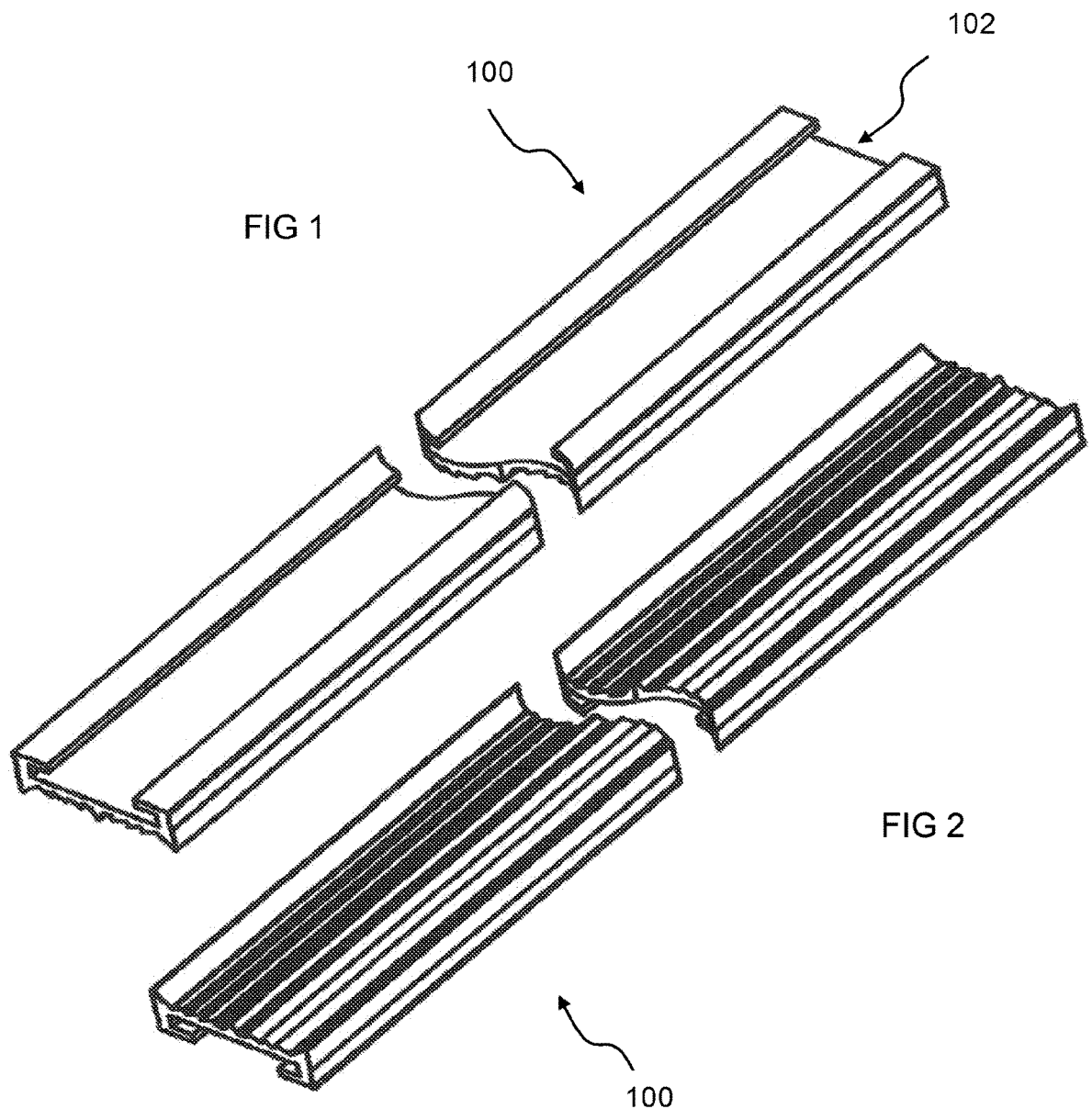

DAMPING EXTRUSIONS

FIELD OF THE INVENTION

The present invention relates to damping extrusions. In particular, but not exclusively, the present invention relates to flexible damping extrusions for use with clamping elements, such as brackets and clips, which secure pipes and the like to structures to absorb sound for the purpose of noise reduction.

BACKGROUND TO THE INVENTION

Piping, tubing, ducting and other conduits are typically secured to a surface of a structure, such as a ceiling or a wall of a building, via a clip or support means that passes at least partially around the piping or other conduit or otherwise engages and releasably retains the piping or the like. The clip or support means is typically attached directly to the surface of the structure, or is attached indirectly to the surface via one or more other elements, such as a bracket or hanger. Examples of the Applicant's brackets and clips for such purposes are disclosed in, for example, WO 2013/185182 and WO 2015/149128.

One problem that exists with clips and brackets for securing piping and the like to structures is the transmission of sound created by, for example, the passage of fluids along piping and the like. This is a particular problem in larger building structures such as office buildings, apartment blocks and other multi-level structures comprising a higher density of piping and other conduits required to service the higher density of occupants and facilities. It is desirable to minimise the transmission of sound, for example, between adjacent floors of a building and/or between adjacent offices, apartments or the like.

Known attempts to reduce sound transmissions associated with piping and other conduits is to place a length of insulation between the clip or bracket and the piping. For example, a simple flat length of rubber, such as a length of flat ethylene propylene diene monomer (EPDM), is clamped between the clip and the piping in an effort to absorb the sound and reduce sound transmissions. Some examples of the lengths of rubber comprise a pair of formed sides comprising recesses to receive the edges of the clip or bracket. In some examples, the length of insulation is cut according to the size of the clip and sold therewith. Such solutions are sometimes referred to as acoustic clips.

However, one problem with the aforementioned lengths of rubber is that the insulation is clamped firmly between the clip or bracket and the pipe and often compressed, such that the ability of the rubber insulation to absorb sound is significantly diminished. Another problem is that the length of insulation needs to be tailored to the particular size and shape of clip where they are sold together. This can be problematic where a large number of different sizes and/or shapes of clip or bracket are produced.

Attempts to address the issue of the insulation being compressed between the clip or bracket and the piping or the like involve forming the length of insulation with one or more protrusions on one side of the flat surface of the insulation with a channel or the like adjacent the protrusion(s). In use the protrusions contact either the clip or the piping. The rationale is that voids or air spaces are created either between the clip and the insulation or between the piping and the insulation. The voids or air spaces help to absorb the sound and thus help to attenuate transmission of the sound. However, when the insulation is clamped firmly between the clip and the pipe the insulation is still compressed, thus compressing the voids and reducing the ability of the insulation to absorb the sound and thus attenuate transmission of the sound. This problem is exacerbated when the insulation is used with a size and/or shape of clip for which it was not intended.

The reference to any prior art in this specification is not, and should not be taken as, an acknowledgement or any form of suggestion that the prior art forms part of the common general knowledge.

OBJECT OF THE INVENTION

It is a preferred object of the invention to provide a damping extrusion for clips or brackets that addresses or at least ameliorates one or more of the aforementioned problems of the prior art and/or provides a useful commercial alternative.

SUMMARY OF THE INVENTION

The present invention relates to damping extrusions for use with clips or brackets or the like for holding piping, tubing, ducting and/or other conduits, wherein, in use, the damping extrusions create voids or air spaces at least between the damping extrusion and the piping that resist compression, thus maintaining the voids or air spaces to absorb and thus attenuate transmission of sound.

In some embodiments of the damping extrusions used with an embodiment of the Applicant's clip, voids or air spaces are also created between the damping extrusion and the clip to further improve sound absorption.

In one form, although not necessarily the broadest form, the present invention resides in a damping extrusion for use with a clip for piping/tubing/ducting, the damping extrusion comprising:

an elongate body having an upper surface that, in use, faces the clip and a lower surface that, in use, faces the piping/tubing/ducting;

a first protrusion extending from the lower surface at or towards each side of the elongate body; and a second protrusion extending from the lower surface at or about a centre of the elongate body;

wherein an inner wall of at least one of the first protrusions is concave.

Preferably, the upper surface of the elongate body is opposite the lower surface.

Preferably, the inner wall of both of the first protrusions is concave.

Suitably, a radius of curvature of the concave inner wall is between about 7 mm and about 11 mm, more suitably between about 8 mm and 10 mm and in a preferred embodiment about 9.2 mm.

Suitably, the first protrusions extend from the lower surface to the same or a similar extent as the second protrusion. Preferably, the first protrusions extend from the lower surface to a greater extent than the second protrusion. More preferably, the first protrusions extend from the lower surface between 3% and 8% more than the second protrusion.

Preferably, the damping extrusion further comprises a side wall at or towards each side of the elongate body extending upwardly from the upper surface of the elongate body, one or both of the side walls comprising a concave recess on an outside thereof.

Preferably, one or both of the side walls comprises a flange at the top thereof, the or each flange extending towards a centre of, and substantially parallel to, the elongate body to create a channel between the or each flange and the elongate body to receive the or each edge of the clip.

Suitably, the lower surface of the elongate body comprises one or more third protrusions between one or both of the first protrusions and the second protrusion. Preferably, the lower surface comprises a plurality of third protrusions between one or both of the first protrusions and the second protrusion, the plurality of third protrusions optionally forming a sawtooth profile.

In some embodiments, where the clip comprises a hollow body member comprising an indent along at least part of the length thereof, a void is created between the upper surface of the damping extrusion and the hollow body member of the clip.

Preferably, the damping extrusion is flexible and can be shaped to fit one or more sizes of clip.

Preferably, the damping extrusion is made from a thermoplastic vulcanizate (TPV) such as Santoprene™ or a composition comprising a percentage of Santoprene™.

In another form, although not necessarily the broadest form, the present invention resides in a clip for releasably retaining piping/tubing/ducting and the aforementioned damping extrusion coupled to the clip. This arrangement creates one or more voids between the lower surface of the extrusion and the piping/tubing/ducting that resist compression.

Preferably, the clip comprises a hollow body member of cross sectional shape which is substantially complementary to the shape of the piping/tubing/ducting, the hollow body member comprising an indent along at least part of the length thereof, thus creating a void between the upper surface of the extrusion and the hollow body member of the clip.

In a further form, although not necessarily the broadest form, the present invention resides in a damping extrusion for use with a clip for piping/tubing/ducting, wherein the damping extrusion is made from a thermoplastic vulcanizate (TPV) such as Santoprene™ or a composition comprising a percentage of Santoprene™.

In a yet further form, although not necessarily the broadest form, the present invention resides in a damping extrusion for use with a clip for piping/tubing/ducting, the damping extrusion comprising:
an elongate body having an upper surface that, in use, faces the clip and a lower surface that, in use, faces the piping/tubing/ducting;
a first protrusion extending from the lower surface at or towards each side of the elongate body;
a second protrusion extending from the lower surface at or about a centre of the elongate body; and
a side wall at or towards each side of the elongate body extending upwardly from the upper surface of the elongate body, wherein one or both of the side walls comprise a concave recess on an outside thereof.

In another form, although not necessarily the broadest form, the present invention resides in a damping extrusion for use with a clip for piping/tubing/ducting, the damping extrusion comprising a plurality of protrusions extending from a lower surface of the damping extrusion, the lower surface, in use, facing the piping/tubing/ducting, wherein one or more voids are created between the lower surface and the piping/tubing/ducting that resist compression thus maintaining the voids to absorb and thus attenuate transmission of sound, wherein the damping extrusion is made from a thermoplastic vulcanizate (TPV) to further attenuate the transmission of sound.

Further forms and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein:

FIG. 1 is a perspective view of a damping extrusion according to one embodiment of the invention;

FIG. 2 is a perspective view of the underside of the damping extrusion shown in FIG. 1;

Figure 3:
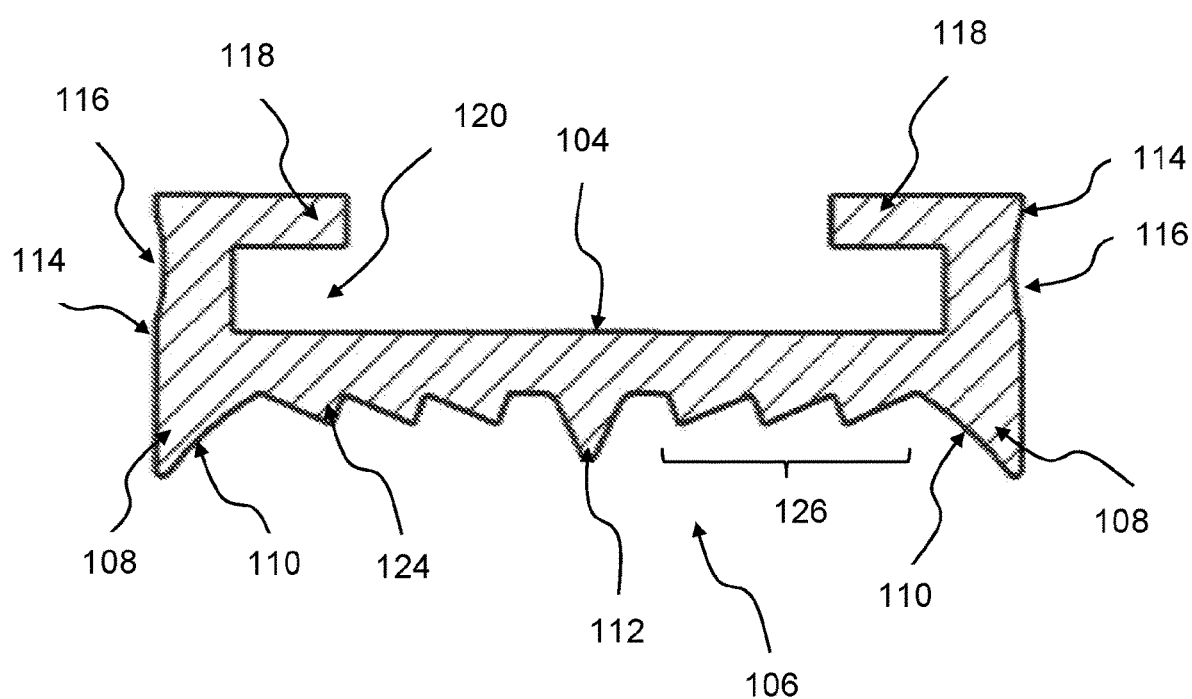
FIG. 3 is a sectional view of the damping extrusion shown in FIG. 1.

Skilled addressees will appreciate that the drawings may be schematic and that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

The present invention relates to damping extrusions for use with clips or brackets or the like for holding piping, tubing, ducting and/or other conduits, wherein, in use, the damping extrusions create voids or air spaces at least between the damping extrusion and the piping that resist compression, thus maintaining the voids or air spaces to absorb and thus attenuate transmission of sound. In some embodiments of the damping extrusions used with an embodiment of the Applicant's clip, voids or air spaces are also created between the damping extrusion and the clip to further improve sound absorption.

FIG. 1 is a perspective view of a damping extrusion 100 for use with a clip for releasably retaining piping/tubing/ducting or the like. FIG. 2 is a perspective view of an underside of the damping extrusion 100 shown in FIG. 1. The damping extrusion 100 comprises an elongate body 102 that can be extruded or otherwise formed using known techniques in long lengths. The long lengths can then be cut to form damping extrusions 100 of desired lengths according to and compatible with the size of clip to which the damping extrusion 100 is to be coupled.

Figure 4:
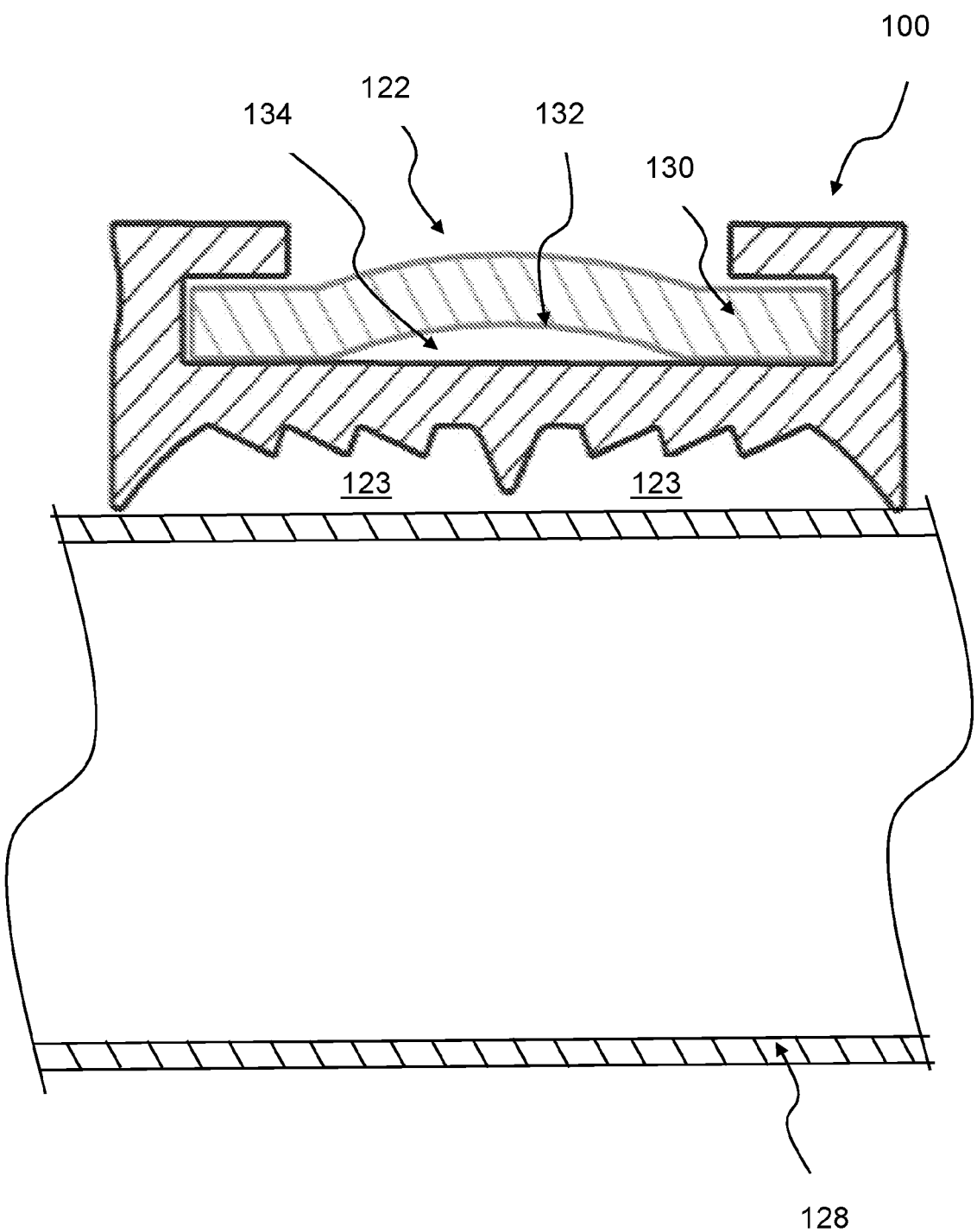
FIG. 4 is a sectional view of the damping extrusion shown in FIG. 1 coupled to a clip releasably retaining a section of piping/tubing/ducting.

With additional reference to FIGS. 3 and 4, the elongate body 102 of the damping extrusion 100 comprises an upper surface 104 that, in use, faces the clip 122 and a lower surface 106 that, in use, faces the piping/tubing/ducting 128 or the like to which the clip 122 is to be releasably retained. In the embodiment shown in FIGS. 1-4, the upper surface 104 of the elongate body 102 is opposite the lower surface 106.

In the embodiment shown in FIGS. 1-3, the upper surface 104 is planar or substantially planar. In alternative embodiments however, it is envisaged that the upper surface 104 can comprise one or more protrusions.

The damping extrusion 100 comprises a first protrusion 108 extending from the lower surface 106 at or towards each side of the elongate body 102. An inner wall 110 of at least one of the first protrusions 108 is concave. In the preferred embodiment of the damping extrusion 100 shown in FIGS. 1-4, the inner walls 110 of both of the first protrusions 108 are concave. In the preferred embodiment of the damping extrusion 100 shown in FIGS. 1-4, for a damping extrusion having a width of 25 mm, the first protrusions 108 have a width of about 3.0 mm and a radius of curvature of the concave inner wall 110 is about 9.2 mm. However, it will be appreciated that the present invention is not limited to this specific width of the first protrusions 108 or radius of curvature of the concave inner wall 110, which will depend on the overall width of the damping extrusion. In other embodiments, the radius of curvature of the concave inner wall 110 is between about 7 mm and about 11 mm and more suitably between about 8 mm and 10 mm.

The damping extrusion 100 comprises a second protrusion 112 extending from the lower surface 106 at or about a centre of the elongate body 102. In the embodiment of the damping extrusion 100 shown in FIGS. 1-4, the second protrusion 112 is substantially triangular in cross section, has a width at its base of about 2.2 mm and an apex angle of about 50 degrees.

In some embodiments, the first protrusions 108 extend from the lower surface 106 to the same or a similar extent as the second protrusion 112. Preferably, the first protrusions 108 extend from the lower surface 106 to a greater extent than the second protrusion 112. More preferably, the first protrusions 108 extend from the lower surface 106 between about 3% and about 8% more than the second protrusion 112. In the embodiment of the damping extrusion 100 shown in FIGS. 1-4, for a damping extrusion 100 having a width of 25 mm, the first protrusions 108 extend from the lower surface 106 a length of 0.5 mm more than the second protrusion 112.

The damping extrusion 100 comprises a side wall 114 at or towards each side of the elongate body 102 extending upwardly from the upper surface 104 of the elongate body. In the embodiment of the damping extrusion 100 shown in FIGS. 1-4, for a damping extrusion having a width of 25 mm, side walls 114 extend 4.0 mm above the upper surface 104. According to some embodiments, one or both of the side walls 114 comprise a concave recess 116 on an outside surface thereof. In the embodiment of the damping extrusion 100 shown in FIGS. 1-4, the concave recess 116 is provided on the outside surface of both side walls 114 and has a radius of curvature of 5.4 mm. In other embodiments, the concave recess 116 can be provided on an inside surface of one or both of the side walls 114. In further embodiments, the concave recess 116 can be provided on an outside surface and on an inside surface of one or both of the side walls 114.

One or both of the side walls 114 comprises a flange 118 at the top thereof. In the embodiment of the damping extrusion 100 shown in FIGS. 1-4, a respective flange 118 extends from the top of each of the side walls 114. The flanges 118 extend towards a centre of the elongate body 102 and are parallel or substantially parallel to the elongate body 102. As such, the flanges 118 create a channel 120 between the flanges and the upper surface 104 of the elongate body 102 to receive the edges of the clip 122. In the embodiment of the damping extrusion 100 shown in FIGS. 1-4, for a damping extrusion having a width of 25 mm, the flanges are about 5.5 mm long, the channel 120 between the flanges 118 and the upper surface 104 of the elongate body 102 is about 2.5 mm. An embodiment of one of the Applicant's clips 122 received within the channel 120 is shown in FIG. 4 and discussed hereinafter.

With particular reference to FIG. 3, the lower surface 106 of the elongate body 102 comprises one or more third protrusions 124 between one or both of the first protrusions 108 and the second protrusion 112. In the embodiment of the damping extrusion 100 shown in FIGS. 1-4, the lower surface 106 comprises a plurality of third protrusions 124 between both of the first protrusions 108 and the second protrusion 112. The plurality of third protrusions 124 form a sawtooth profile 126 comprising three third protrusions 124 on each side of the second protrusion 112. In the embodiment of the damping extrusion 100 shown in FIGS. 1-4, for a damping extrusion having a width of 25 mm, each of the third protrusions 124 is about 2.4 mm in width with an apex angle of about 84 degrees. It should be appreciated that the present invention is not limited to the presence or the specific number of the third protrusions 124.

Preferred embodiments of the damping extrusion 100 of the present invention is made from a thermoplastic vulcanizate (TPV) such as Santoprene™ or a polymer composition comprising a percentage of Santoprene™. The use of such materials contributes to the damping extrusion 100 of the present invention providing superior sound absorption and noise attenuation compared with at least some of the commercially available damping extrusions and acoustic clips.

In some preferred embodiments, the damping extrusion 100 of the present invention is made from a thermoplastic vulcanizate (TPV) in the form of Santoprene™ 8211-45 which can comprise one or more additives. In such embodiments, the damping extrusion 100 is soft, colourable and non-hygroscopic. The ability to colour the damping extrusion can be useful to signify the type of pipe/conduit/pipe with which the damping extrusion is to be used, e.g. water pipe, gas pipe and the like. The damping extrusion 100 has a density of 0.93 g/cm$^3$, a hardness of 45 Shore A (±5 Shore A), a brittleness temperature of −62° C. (ISO 812 and ASTM D746), RTI Elec: 100° C. (UL 746) and RTI Str 0.12 in (3.0 mm): 95° C. (UL 746). In some embodiments the damping extrusion 100 is made from an automotive grade of thermoplastic vulcanizate (TPV). It will be understood that strict compliance with the above values is not essential to the present invention and variations from these values will still fall within the scope of the present invention.

Hence, preferred embodiments of the damping extrusion 100 are flexible and the damping extrusion 100 can be shaped to fit one or more sizes and/or shapes of clip. For example, the clips may have a non-circular shape and the flexible damping extrusion 100 can be shaped to fit accordingly.

With reference to FIG. 4, according to another form, the present invention resides in a clip 122 for releasably retaining piping/tubing/ducting 128 or the like and the aforementioned damping extrusion 100 coupled to the clip 122. This arrangement creates one or more voids or air spaces 123 between the lower surface 106 of the elongate body 102 of the extrusion 100 and the outer surface of the piping/tubing/ ducting 128 that resist compression when the clip 122 is tightened around the piping/tubing/ducting or the like. The damping extrusion 100 of the present invention will provide noise reduction when coupled to a wide range of known clips and the dimensions of the damping extrusion 100 can be adjusted accordingly.

According to some embodiments, the clip 122 comprises a hollow body member 130 of cross sectional shape which is substantially complementary to the shape of the piping/tubing/ducting 128 to which the clip 122 is being releasably attached. With reference to FIG. 4, according to one of the Applicant's clips 122, the hollow body member 130 comprises an indent 132 along at least part of the length thereof, thus creating a void 134 between the upper surface 104 of the extrusion 100 and the hollow body member 130 of the clip 122.

In use, the clip 122 can be supplied with the damping extrusion 100 already coupled to the clip. Alternatively, the clip 122 and the damping extrusion 100 can be supplied uncoupled and the damping extrusion 100 is coupled to the clip 122 by the edges of the hollow body member 130 of the clip being received within the channel 120 of the damping extrusion. Piping/tubing/ducting 128 is passed through the clip 122 and the clip tightened around the piping/tubing/ducting 128 to releasably retain the piping/tubing/ducting 128. Alternatively, if the clip 122 and the damping extrusion 100 are supplied uncoupled, the clip 122 can be placed loosely around the piping/tubing/ducting 128 and the damping extrusion 100 inserted between the clip 122 and the piping/tubing/ducting 128 wherein the edges of the hollow body member 130 of the clip are received within the channel 120 of the damping extrusion as described above before tightening of the clip 122.

When the clip 122 is tightened, the concave inner walls 110 of the first protrusions 108 allow the damping extrusion 100 to spread. Spreading of the damping extrusion is further facilitated by the concave recess 116 in one or both side walls 114, which reduces the rigidity of the side wall 114 in which the recess 116 is provided. Consequently, the damping extrusion 100 resists compression when the clip 122 is tightened and the one or more voids or air spaces between the lower surface 106 of the damping extrusion 100 and the piping/tubing/ducting 128 are maintained, or compression of the voids/air spaces is reduced or minimised compared with at least some of the known damping extrusions, such that the voids or air spaces are preserved to absorb and thus attenuate transmission of sound.

The second protrusion 112 also assists in maintaining the voids or air spaces, or reducing or minimising compression of the voids or air spaces when the clip is tightened. The second protrusion 112 and the first protrusions 108 minimise contact of the damping extrusion 100 with the piping/tubing/ducting 128 whilst maximising the damping effect of the damping extrusion 100.

The one or more third protrusions 124 between the first protrusions 108 and the second protrusions 112 also assist in absorbing and diffusing sound and thus attenuating transmission of sound.

In embodiments where the Applicant's clip 122 comprising the indent 132 along at least part of the length of the hollow body member 130 of the clip is used, the additional void 134 created between the upper surface 104 of the extrusion 100 and the clip 122 further assists in absorbing and thus attenuating transmission of sound.

The use of thermoplastic vulcanizate (TPV) such as Santoprene™ or a polymer composition comprising a percentage of Santoprene™ further contributes to the damping extrusion 100 of the present invention providing superior sound absorption and noise attenuation compared with at least some of the commercially available damping extrusions and acoustic clips.

The capability of the damping extrusion 100 to spread also enables the same damping extrusion 100 of the present invention to be used with a variety of different diameter piping/tubing/ducting and different diameter clips, thus rendering the damping extrusion 100 of the present invention more versatile compared with at least some of the commercially available damping extrusions and acoustic clips.

Figure 5:
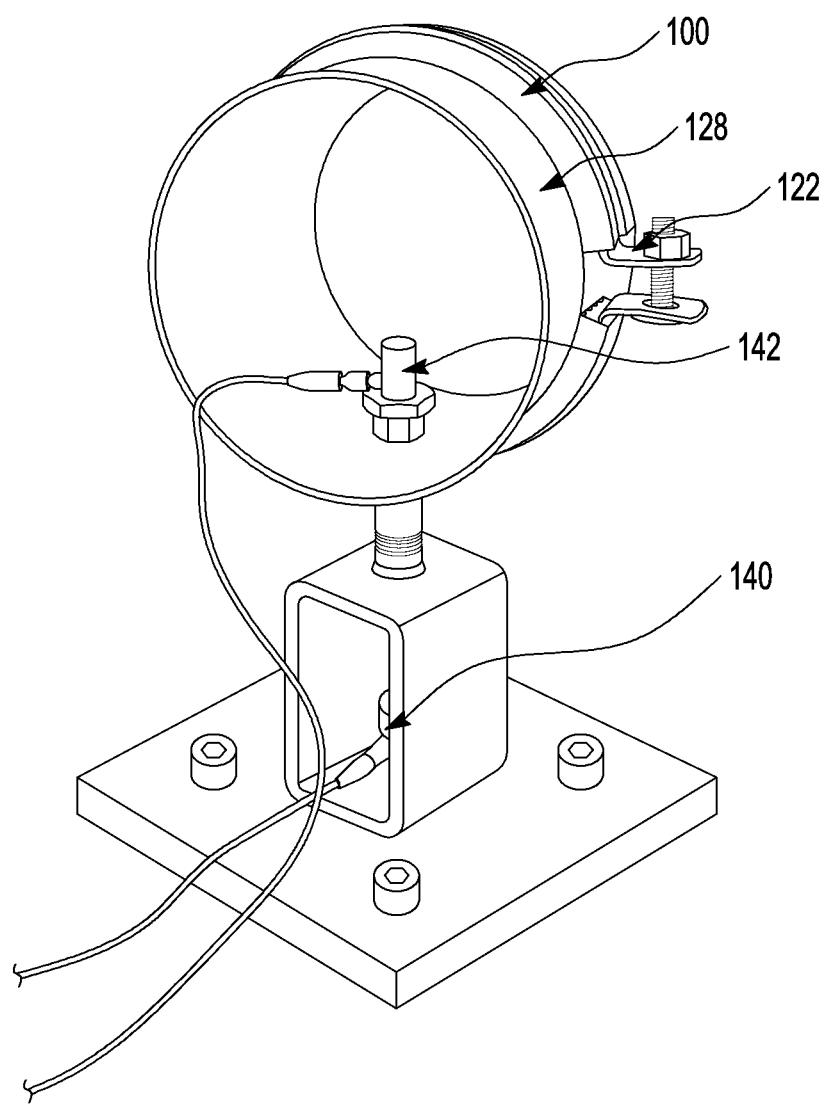
FIG. 5 is an image of an apparatus for comparing the damping capabilities of the present invention with known damping extrusions.

With reference to FIG. 5, the damping capability of embodiments of the damping extrusion 100 of the present invention was tested against the damping capability of known damping extrusions using the apparatus shown in FIG. 5, which comprises an input vibration accelerometer 140 and a response vibration accelerometer 142 coupled to a section of piping/tubing/ducting 128. The damping extrusion 100 is attached to the clip 122 and the clip is attached to the piping/tubing/ducting 128. The ratio of response/input was measured as the vibration was swept from 20 Hz to 6000 Hz, to determine the isolation performance over this frequency range. The damping extrusion 100 according to embodiments of the present invention was compared against the Applicant's rigid clamp and against four other known damping extrusions.

The most sensitive frequency range for the human ear is 1000 Hz-4000 Hz, with 1000 Hz being the 'reference' frequency (i.e. zero 'A-weighting'). The results have therefore been A-weighted so that the height of each bar at different frequencies can be compared for importance as would be perceived by the human ear.

Figure 6:
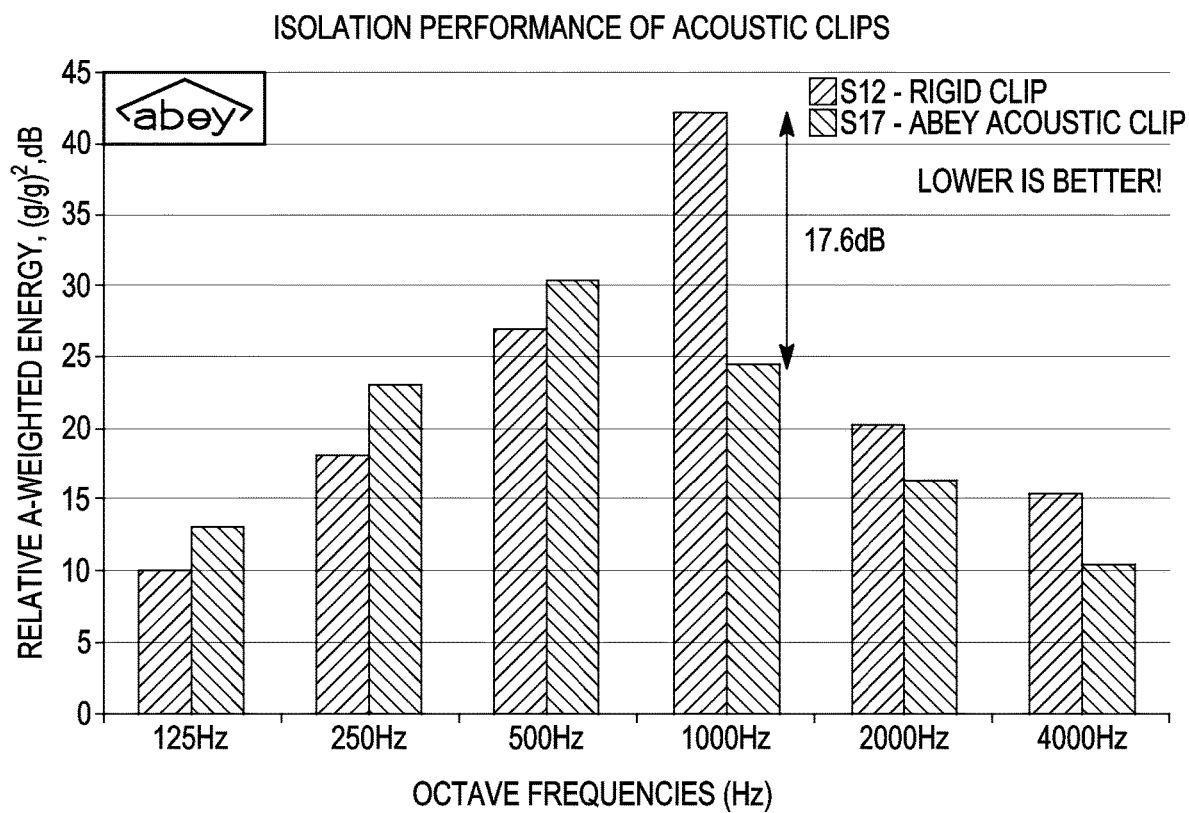
FIG. 6 is a graph showing the isolation performance of the damping extrusion of the present invention compared with the Applicant's known clip at various frequencies.
Figure 7:
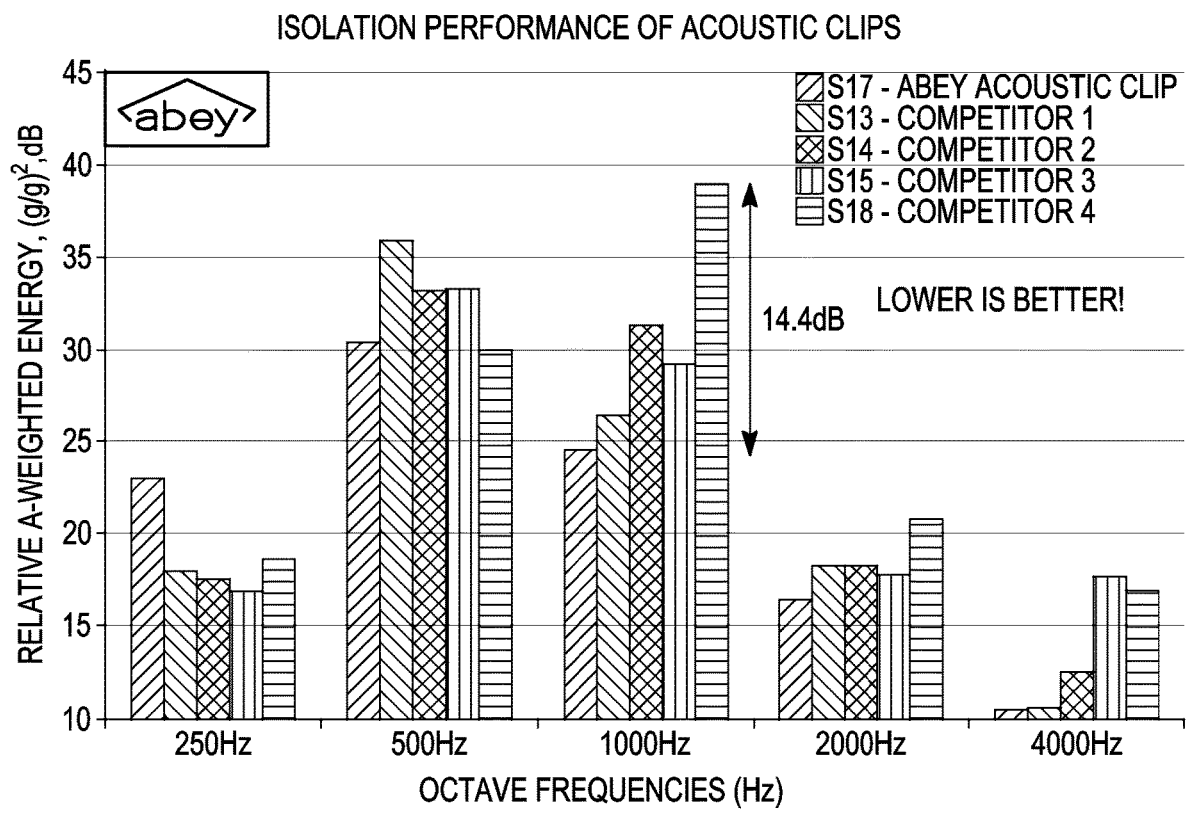
FIG. 7 is a graph showing the isolation performance of the damping extrusion of the present invention compared with the four other known damping extrusions at various frequencies.

With reference to FIGS. 6 and 7, the damping extrusion 100 according to embodiments of the present invention achieves a 77% reduction in transmitted vibration, and hence resultant sound over the Noise Reduction Coefficient (NRC) octave range from 250 Hz-2000 Hz compared with a conventional 'rigid' clamp. The maximum reduction was 17.6 dB for the 1000 Hz octave.

The damping extrusion 100 according to embodiments of the present invention is overwhelmingly better than all four competitors' clamps tested—by up to 14.4 dB at 1000 Hz, and by typically 2-5 dB at 500 Hz, 2000 Hz, and 4000 Hz across the most sensitive frequency range for the human ear.

Figure 8:
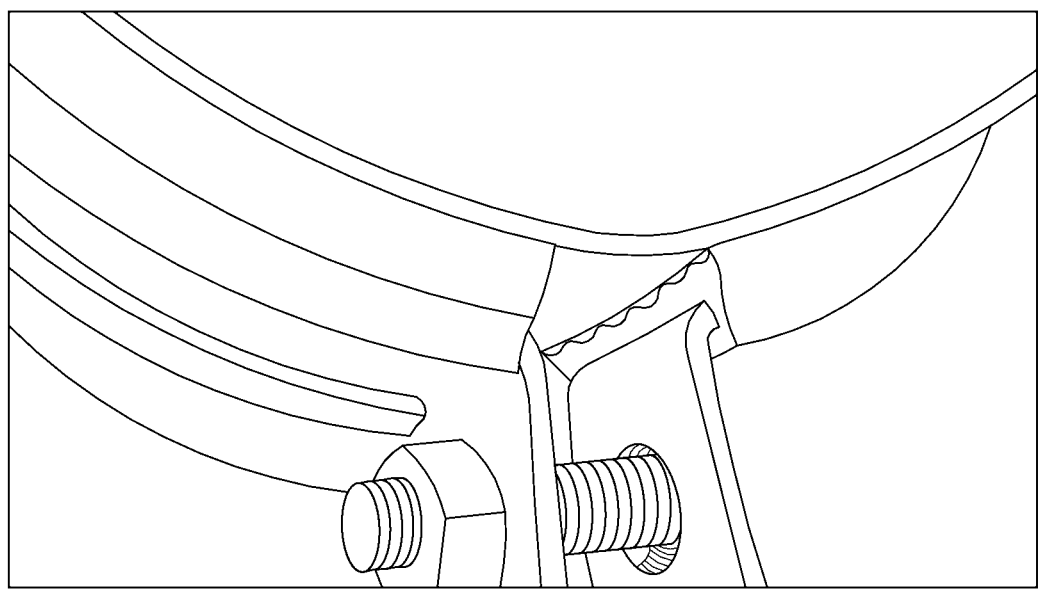
FIG. 8 is an image showing the damping extrusion of the present invention coupled to a clip.

It has been found that the damping extrusion 100 according to embodiments of the present invention is very effective. The relatively soft elastomer selected is very suitable. FIG. 8 shows the damping extrusion 100 according to an embodiment of the present invention coupled to a clip and attached to a section of piping/tubing/ducting 128. FIG. 8 shows how the outer ribs 'splay out' to accommodate different radial clearances without compressing to generate a larger and undesirably stiffer contact area. The centre rib barely contacts the pipe surface as intended, while the minor ribs do not contact the pipe at all as intended.

Hence, the damping extrusions 100 according to embodiments of the present invention address or at least ameliorate at least some of the aforementioned problems associated with known damping extrusions and acoustic clips.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the present invention without limiting the invention to any one embodiment or specific collection of features. Persons skilled in the relevant art may realize variations from the specific embodiments that will nonetheless fall within the scope of the invention. For example, while embodiments of the invention have been described separately, a skilled addressee will appreciate that the features of such embodiments may be combined in a single embodiment where possible.

The invention claimed is:

1. A damping extrusion made from a thermoplastic vulcanizate (TPV) for use with a clip for piping/tubing/ducting, the damping extrusion comprising:
    an elongate body having a side wall at, or towards each side, an upper surface for orientation towards the clip, and a lower surface for attachment to the piping/tubing/ducting;
    one or more first protrusions extending from the lower surface at, or towards each side of the elongate body; and
    a second protrusion extending from the lower surface at, or about a centre of the elongate body, the second protrusion having a substantially triangular cross section;
    wherein the damping extrusion is supplied prior to use such that the damping extrusion is in an uncompressed state and an inner wall of at least one of the one or more first protrusions is concave and at least one or both of the side walls of the elongate body has a concave recess.

2. The damping extrusion of claim 1, wherein the one or more first protrusions extend from the lower surface to a same, or a similar extent as the second protrusion.

3. The damping extrusion of claim 1, wherein the one or more first protrusions extend from the lower surface to a greater extent than the second protrusion, in particular, the one or more first protrusions extend from the lower surface between 3% and 8% more than the second protrusion.

4. The damping extrusion of claim 1, wherein each side extends upwardly from the upper surface of the elongate body.

5. The damping extrusion of claim 1, wherein the concave recess is on an outside surface of the side wall.

6. The damping extrusion of claim 1, wherein the concave recess is on an inside surface of the side wall.

7. The damping extrusion of claim 1, wherein one or both of the side walls comprises a flange at the top thereof.

8. The damping extrusion of claim 7, wherein each flange extends towards a centre of, and substantially parallel to, the elongate body to create a channel between each flange and the elongate body for receipt of each edge of the clip.

9. The damping extrusion of claim 1, wherein the lower surface of the elongate body comprises one or more third protrusions between the one or more first protrusions and the second protrusion.

10. The damping extrusion of claim 9, wherein the lower surface comprises a plurality of third protrusions between one or both of the one or more first protrusions and the second protrusion.

11. The damping extrusion of claim 10, wherein the plurality of third protrusions form a sawtooth profile.

12. The damping extrusion of claim 1, wherein when used with the clip, a void is created between the upper surface of the damping extrusion and an indent along at least part of a hollow body member of the clip.

13. The damping extrusion of claim 1, wherein when used with the clip for piping, tubing, or ducting, one or more voids are created between the lower surface of the damping extrusion and the piping/tubing/ducting that resist compression.

14. The damping extrusion of claim 1, wherein the inner wall of the one or more first protrusions is concave.

15. The damping extrusion of claim 1, wherein a radius of curvature of the concave inner wall of the one or more first protrusions is between about 7 mm and about 11 mm, more suitably between about 8 mm and 10 mm and in a preferred embodiment is about 9.2 mm.

16. The damping extrusion of claim 1, wherein the damping extrusion is flexible and can be shaped to fit one or more sizes of clip.

17. The damping extrusion of claim 1, wherein the thermoplastic vulcanizate (TPV) is in the form of Santoprene™ or a composition comprising a percentage of Santoprene™.

18. The damping extrusion of claim 1, wherein the thermoplastic vulcanizate is colourable and the colour signifies a type of pipe/conduit/pipe with which the damping extrusion is to be used.

19. A clip for releasably retaining piping/tubing/ducting comprising the damping extrusion as claimed in claim 1 coupled to the clip.

20. The clip of claim 19, wherein the clip comprises a hollow body member of cross sectional shape which is substantially complementary to the shape of the piping/tubing/ducting.

21. A damping extrusion for use with a clip for piping/tubing/ducting, the damping extrusion comprising a plurality of protrusions extending from a lower surface of the damping extrusion, including, one or more first protrusions extending from the lower surface at, or towards each side of the damping extrusion, and a second protrusion extending from the lower surface at, or about a centre of the damping extrusion, the second protrusion having a substantially triangular cross section, wherein the damping extrusion is supplied prior to use such that the damping extrusion is in an uncompressed state and an inner wall of at least one of the one or more first protrusions is concave and at least one or both of the side walls of the damping extrusion has a concave recess, wherein when the damping extrusion is attached for piping/tubing/ducting, one or more voids are created between the lower surface and the piping/tubing/ducting that can resist compression, thus maintaining the voids to absorb and attenuate transmission of sound, wherein the damping extrusion is made from a thermoplastic vulcanizate (TPV) to further attenuate the transmission of sound.

* * * * *